United States Patent [19]

Slaminski

[11] Patent Number: 4,520,796
[45] Date of Patent: Jun. 4, 1985

[54] LIGHTWEIGHT SOLAR COLLECTOR

[75] Inventor: J. Michael Slaminski, 13567 Bear Valley Rd., Moorpark, Calif. 93021

[73] Assignees: J. Michael Slaminski; William W. Haefliger, both of Pasadena, Calif.; a part interest

[21] Appl. No.: 593,649

[22] Filed: Mar. 26, 1984

[51] Int. Cl.³ ............................................. F24J 3/02
[52] U.S. Cl. .................................... 126/445; 126/450
[58] Field of Search ............... 126/426, 443, 444, 445, 126/450

[56] References Cited

U.S. PATENT DOCUMENTS

| | | | |
|---|---|---|---|
| 4,010,733 | 3/1977 | Moore | 126/450 X |
| 4,146,012 | 3/1979 | Elkins et al. | 126/444 |
| 4,426,999 | 1/1984 | Evans et al. | 126/445 X |

Primary Examiner—Margaret A. Focarino
Attorney, Agent, or Firm—William W. Haefliger

[57] ABSTRACT

A solar collector comprises
(a) a first plastic sheet forming multiple parallel branch ducts extending in a longitudinal direction through the sheet length,
(b) a second plastic sheet,
(c) the second sheet mounted on the first sheet to substantially cover the first sheet and to provide a space between the sheets,
(d) the second sheet being transparent so that solar radiation impinging on the second sheet will pass through it and onto the first sheet for heating liquid passing through said ducts.

14 Claims, 11 Drawing Figures

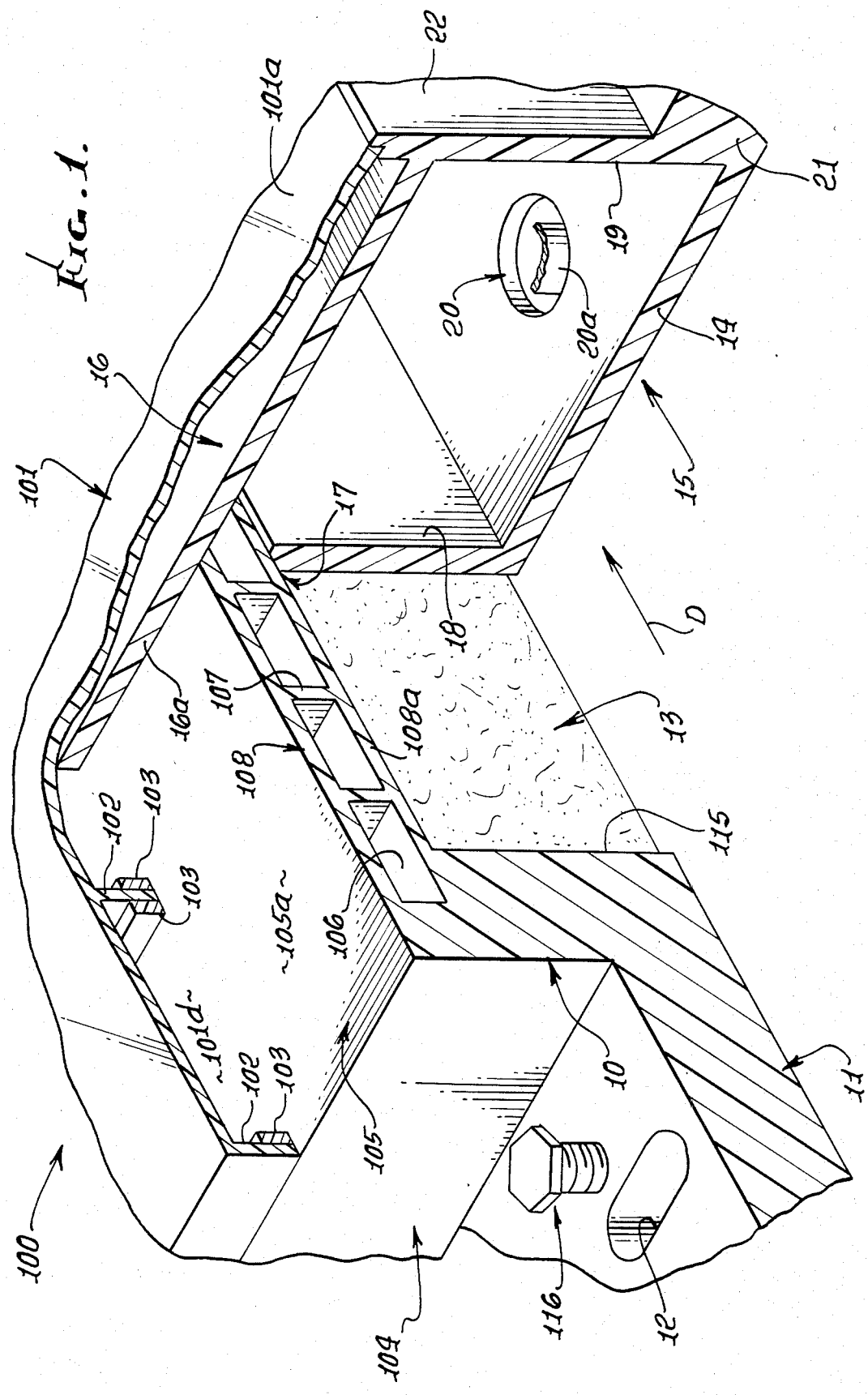

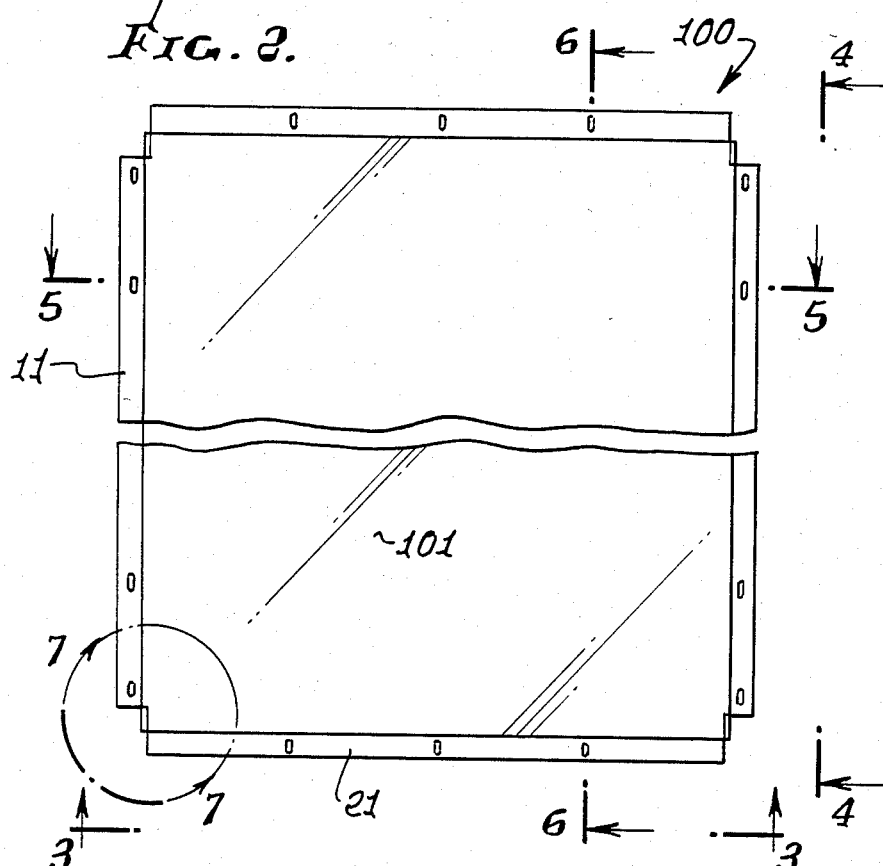
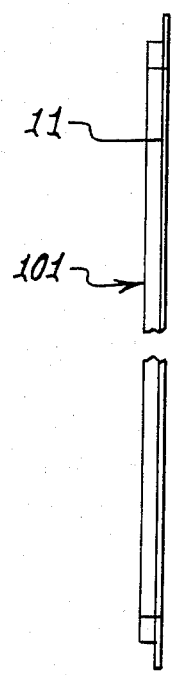
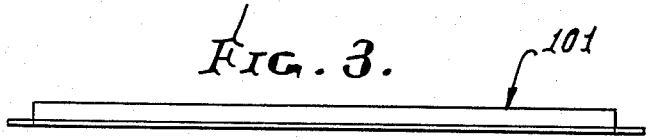
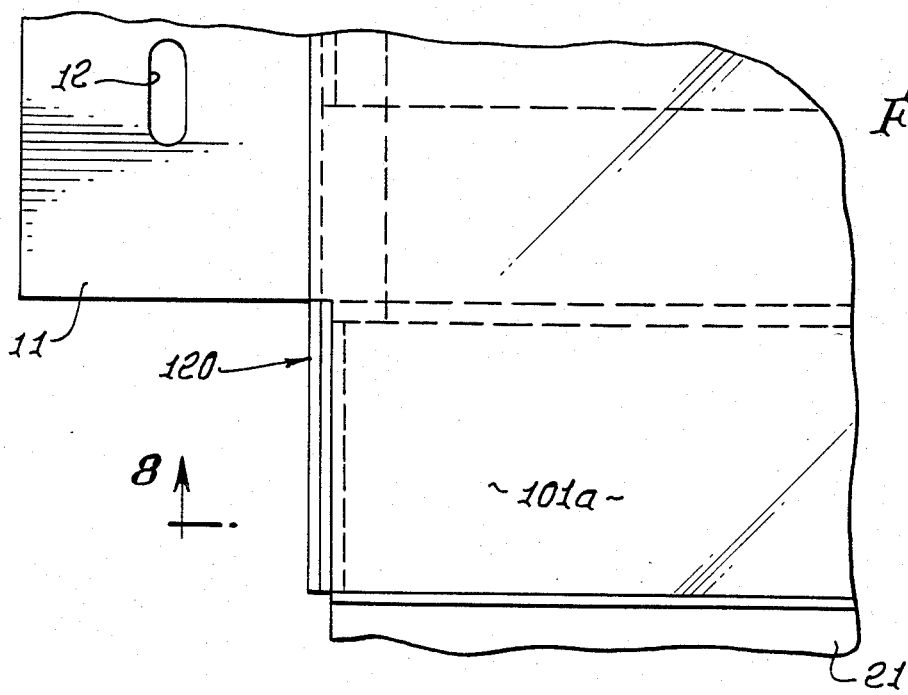

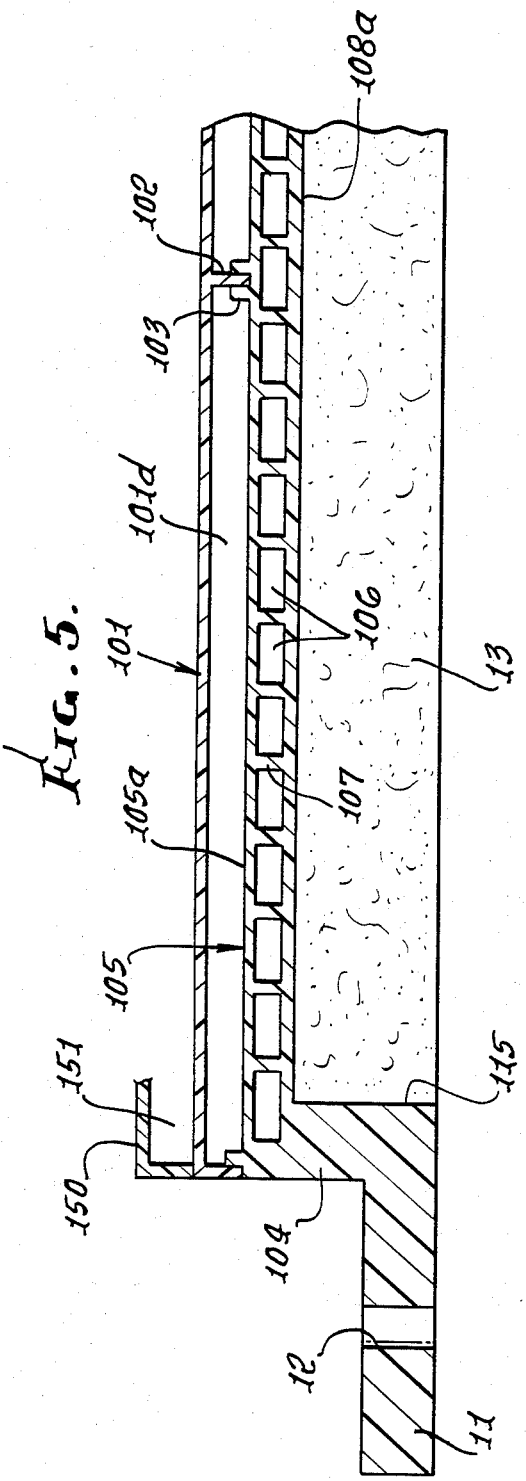
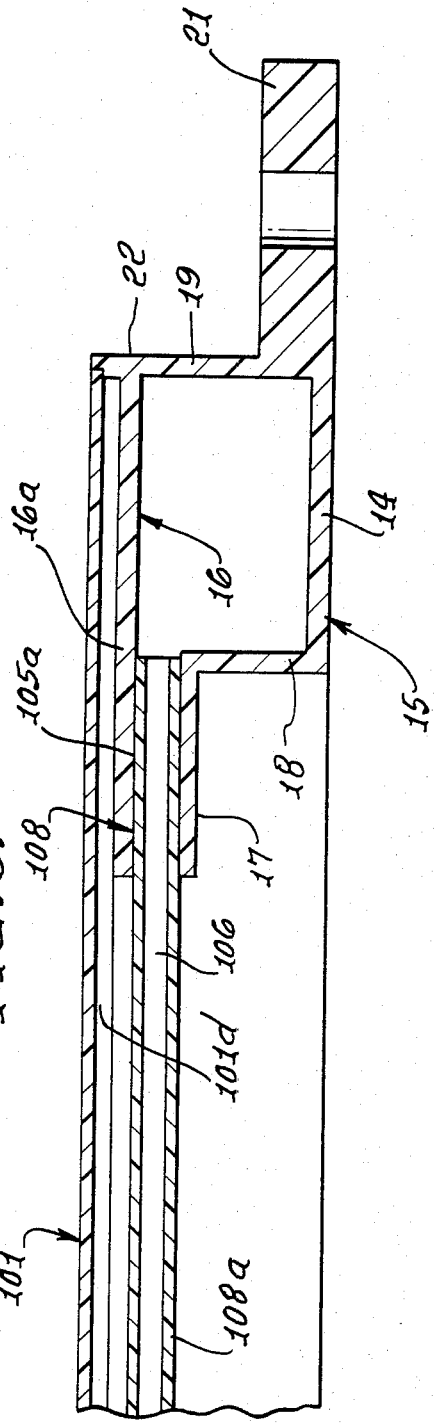

LIGHTWEIGHT SOLAR COLLECTOR

BACKGROUND OF THE INVENTION

This invention relates generally to solar collectors, and more particularly to highly efficient, low-cost, lightweight solar collection which have very simple construction.

There is a critical need for practical low cost solar collectors for residential and commercial building space and hot water heating applications. The same can be said for swimming pool heaters. Prior collectors are, in general, characterized by their relatively high cost and heavy construction necessitated by individual tubes of metal or heavy plastic. The latter must typically be individually attached in position in the collector with consequent excessive labor expense. Also, prior collectors do not have low profile construction and so do not blend in well with building roof or wall architectures.

More specifically, prior solar collectors have been made of metal absorbers of the fin and tube heat exchanger variety, placed in a metal frame insulated on the bottom with a glazing (usually glass) affixed to the top of the frame. The manifolds consisted of metal and there was a considerable amount of exposed piping.

Recently, a number of approaches involving flexible or hardened plastics have emerged. In this regard, the concept of using hard plastic extrusions to form glazings and cooling channels has been reduced to practice by a product called Twinwall Tuffak. Beyond that, the so-called Unitary Collector utilizes a bulky manifold, with no provision for sealing the ends of the manifold or connecting to external piping, and no practical indication of the hardware or other means necessary to mount it on the roof.

SUMMARY OF THE INVENTION

It is a major object of the invention to provide an improved and simplified solar collector characterized by a number of features and advantages. These include:
1. All plastic construction that is low cost and non-corrosive, for long life.
2. Unique design requires the extrusion and assembly of only four (4) separate component geometries to minimize production costs. Coextrusion is not required.
3. Unique design enables shipment and installation of the collector as a single unit, which may be bolted directly onto the plywood sub-roof, thereby replacing roof tile or shingles and eliminating complex mounting hardware. This minimizes building construction labor and material costs.
4. Unique low profile design provides for extensive architectural blending and versatility in both roof and exterior wall installations. Unit has the appearance of a skylight or a window when installed.
5. Unique design features allow differences in thermal expansion between the plastic collector body and insulation to prevent buckling/cracking of these components when temperature changes are encountered in service.
6. Unique design allows for the concealment of unsightly external manifolds and piping. Piping penetrations are underneath the collector.

Basically, the collector comprises, in combination:
(a) a first plastic sheet forming multiple parallel branch ducts extending in a longitudinal direction through the sheet length,
(b) a second plastic sheet,
(c) means mounting the second sheet on the first sheet to substantially cover the first sheet and to provide a space between the sheets,
(d) the second sheet being transparent so that solar radiation impinging on the second sheet wall pass through it and onto the first sheet where it is absorbed for heating liquid passing through the ducts.

Further, the mounting means may comprise spacers extending between the sheets, and attached to one or both of the sheets, whereby the first and second sheets may be separately extruded and then joined. Third and fourth plastic bodies may also be joined to the sheets to provide header ducts for the branch ducts, and may thus be separately extruded. The assembly of these elements is effected in a particularly advantageous and unique manner to facilitate a low profile design, as will appear.

These and other objects and advantages of the invention, as well as the details of an illustrative embodiment, will be more fully understood from the following description and drawings, in which:

DRAWING DESCRIPTION

FIG. 1 is a perspective view of a corner portion of an assembled collector;

FIG. 2 is a plan view of the FIG. 1 collector;

Figure 9:
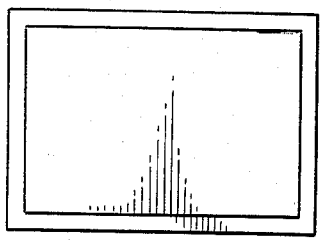
Figure 8:
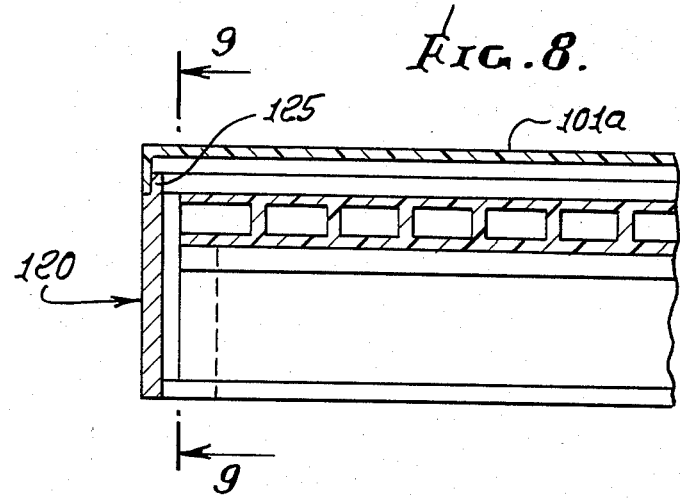
Figure 10:
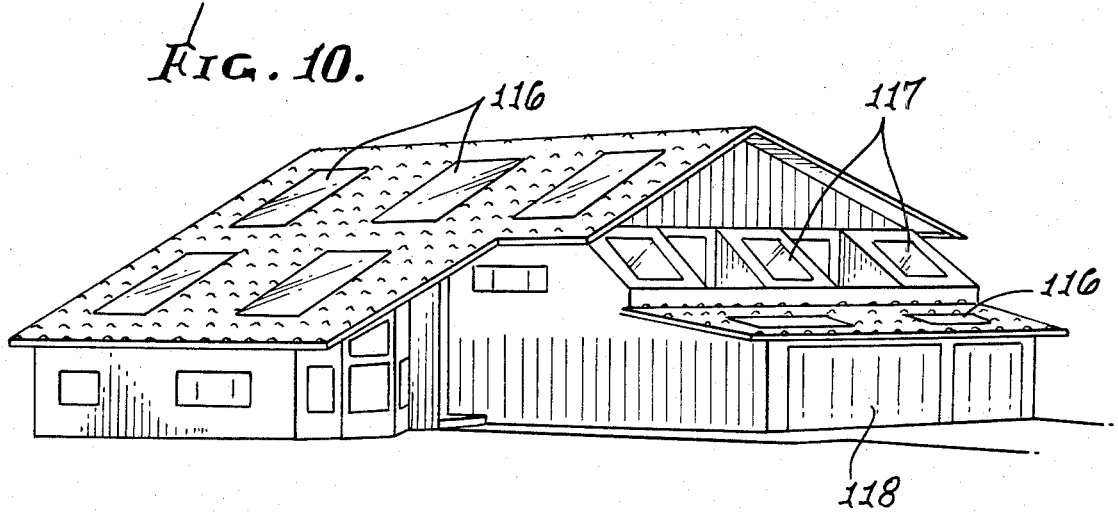
Figure 11:
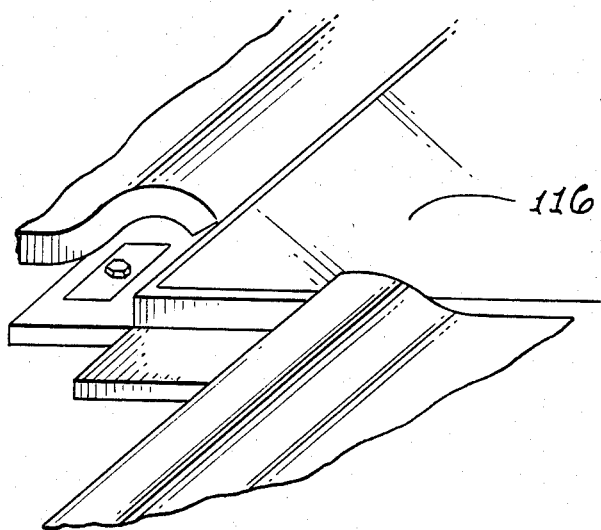

FIGS. 3 and 4 are end views taken on lines 3—3 and 4—4 of FIG. 2;

FIG. 5 is an enlarged section on lines 5—5 of FIG. 2;

FIG. 6 is an enlarged section on lines 6—6 of FIG. 2;

FIG. 7 is an enlarged view showing corner details, and taken on lines 7—7 of FIG. 2;

FIG. 8 is a section on lines 8—8 of FIG. 7;

FIG. 9 is an enlarged section on lines 9—9 of FIG. 8;

FIG. 10 is a perspective view of a dwelling on whose roof and outside walls the invention is installed; and FIG. 11 is an enlarged view of a corner of the installed collector and adjacent roof portions, of FIG. 10.

DETAILED DESCRIPTION

As seen in FIG. 1, the collector 100 includes a transparent sheet plastic glazing 101 and supporting ribs 102, the glazing and ribs having been extruded as a single piece in the same longitudinal direction as the parallel lengths of the supporting ribs. The ribs should be located as far apart as possible to maximize the transmission therebetween of solar energy, yet still provide adequate structural support to maintain the air gaps 101d between the glazing and the surface 105a of an absorber 105. Ribs 102 project normal to the plane of glazing 101, and the plane of surface 105a.

The absorber 105 constitutes an opaque black plastic sheet forming multiple parallel ducts or channels 106 which may extend in the same longitudinal direction as ribs 102, and through the length of the absorber 105 to open at opposite ends thereof. The absorber 105 may be referred to as the first plastic sheet on which the second plastic sheet 101 is mounted, as facilitated by mounting means, including ribs 102. Anchor studs 103, integrally extruded with surface 105a, retain the ribs 102 thereto, as by adhesive. The sheets are typically separately extruded, and then mounted, one on the other. Also, the second sheet is transparent so that solar radiation impinging on the second sheet 101 will pass through it and onto the first sheet 105 where it is absorbed for heating liquid passing through the ducts or channels 106. Air gaps 101d provide an insulating "Greenhouse" effect, enhancing efficiency.

Solar radiation is absorbed at the absorber surface 105a, which transfers the thermal energy by conduction through the absorber top plate 108 to fluid or liquid which flows through the channels 106. Another feature is the extruding of sheet 105 in black plastic to enhance absorption of solar radiation. Further, the entire body 104 is typically extruded in black plastic, as a single piece, that includes the collector flashing 11, side wall 10, lower absorber plate 108a, absorber upper plate 108, support ribs 107, and anchor studs 103. The sheet glazing 101 is typically attached to the collector body 104 as by adhesive or by heat welding of the support ribs 102 to the anchor studs 103. A selective black coating may be painted on the absorber surface 105a or otherwise bonded to it to further improve collection efficiency. The "black" in the body plastic may consist of lamp black, for example.

The side wall 10 and base plate 108a of the collector body 104 advantageously form cavity 115 for reception of block shaped insulation board 13. The latter prevents heat losses out through the bottom of the collector. Insulation board 13 is not necessarily bonded to the collector body 104, so as to prevent thermal stress failures from occurring in the two members.

The flashing 11 advantageously provides a means for bolting the collector directly to the plywood sub-roof of a building without the need for extensive mounting rails, clamps or other costly and unsightly hardware. The subject bolt hole is shown at 12 in FIG. 1. See also bolt 116.

An important feature of the invention is the rectangular manifold 15, which is concealed by the sheet glazing 101 that extends at 101a over the top of the manifold, as shown. The manifold 15 is extruded in direction "D" as a single piece of black plastic and is comprised of walls 14, 18 and 19, two parallel plates 16 and 17, upwardly projecting glazing anchor support flange 22 and a flashing 21 used for direct bolting of the collector to the sub-roof. As seen in FIG. 6, plate 16 extends at 16a over and in contact with surface 105a, and plate 17 extends under and in contact with bottom plate 108a. Two such manifolds are provided, one at each end of the glazings 101 and 105, to respectively communicate the manifold ducts (see duct 101d in FIG. 1) with the branch ducts 106, for fluid flow through the collector. The manifold 15 is bonded to the collector body 104 at the interfaces between top plate 16 and surface 105a, and between bottom plate 17 and undersurface of bottom plate 108a, employing appropriate adhesive or by heat welding. One wall 18 of the manifold 15 retains the insulation board 13 in place at each end of the collector. Another important feature is the provision of coolant piping inlet/outlet 20 in bottom wall 14 of the manifold. As indicated at 20a, bottom piping penetrates into the manifold via opening 20, whereby the external plumbing below the collector is hidden from view, as in an attic, for example. End caps 120 that seal off the opposite ends of the manifold are not shown in FIG. 1, but appear in FIGS. 7, 8 and 9. FIGS. 2 through 4, show the relative sizes of the components.

External elements of the skylight collector in FIG. 2, include specifically, the glazing 101 flashings 11 and 21, and manifold end caps 105. The collector shown in FIGS. 2-4 is up to 4 ft. wide and can be any length up to about 8 ft. long.

FIG. 5 shows details of the clear plastic glazing 101 and black plastic collector body 104.

Typical plastic materials of construction of each element 100 and 104 include:
 1. Polycarbonate (UV stabilized)
 2. Cellulose Acetate Butyrate
 3. Polysulfones Refering to FIGS. 7-9, end cap 120 is shown in detail, the end cap seals the end of the manifold and is bonded to the wall of the manifold with an adhesive or by heat welding. The glazing extension 101a over the manifold and its connection with the end cap at 125 are also clearly illustrated.

The overall object of the invention is to achieve the appearance of a skylight or a window while maintaining very high performance. This effect is made possible by the features described, coupled with the judicious sizing of the glazing and collector body to yield a low profile unit. The versatility and architectural blending possible with this invention is shown in FIG. 10. In particular, the invention has the appearance of a slylight in house and garage roof installations at 116, and windows at 117 in the stucco ramps over the rear of the garage 118. FIG. 10 shows an architecturally appealing structure, heretofore impossible with existing solar technology.

The present invention has the advantage that the clear glazing 101 and the black collector 104 bodies may be extruded separately (at much less expense than if somehow co-extruded) and then are joined very simply. Ready mounting of the collector is accomplished by flashings that are extruded into a single piece as part of the collector body for direct bolting to the roof plywood substrate. Also, the manifold is completely covered by a glazing which conceals the manifold and its connecting piping from view, resulting in a "skylight" appearance. The invention also provides the means to house the insulation board without bonding it to the plastic collector body, thereby eliminating the attendant buckling experienced in the 'plastic components when bonding is attempted.

Unusual advantages include:
A. A low profile solar collector that exhibits ultimate thermal performance, very low manufacturing and installation costs, inherently long service life and high reliability, and the clean appearance of a skylight when installed on a building. The collector is comprised of the combination of:
 (a) A single layered clear plastic glazing, extruded in one piece, with support ribs spaced as far apart as structurally possible to maximize the transmittance of solar radiation. Each glazing support rib is bonded to the collector body via anchor studs. The glazing extending over the coolant manifolds conceals the existence of the manifold structure;
 (b) A black plastic collector body extruded in one piece typically consisting of an absorber surface, cooling channels, absorber plate, support ribs, base plate, side walls and flashings. A side wall feature provides containment for the insulation board, and the flashings allow direct bolting to the roof plywood substrate without traditional metal flashing;
 (c) A rectangular black plastic working fluid manifold (two per collector) designed to blend with the collector body (a) and glazing (b) when assembled to present a skylight appearance on a building. External plumbing is hidden inside the building attic with piping penetrations into the bottom of said manifold. The manifold also provides a containment barrier for the insulation board, as does the collector body side walls (b); and (d) Special black plastic end caps to seal the ends of each manifold, such that support is also provided for the outer glazing rib.

B. Multiple layers of glazings may be provided above the one described in A, each layer with an attendant set of support ribs, all extruded in a single clear plastic piece. See for example glazing 150, and dead air space 151 between glazing 150 and sheet 101, in FIG. 5.

I claim:

1. Solar collector comprising, in combination
(a) a first plastic sheet, extending generally horizontally forming multiple parallel branch ducts extending in a longitudinal direction through the sheet length,
(b) a second single plastic sheet extending generally horizontally,
(c) means mounting the second sheet on the first sheet to substantially cover the first sheet and to provide a space between the sheets, said means including legs between the first and second sheets,
(d) the second sheet being transparent so that solar radiation impinging on the second sheet will pass through it and onto the first sheet for heating liquid passing through said ducts,
(e) a third plastic body attached to the first sheet and defining a first header duct communicating with said branch ducts at one end of the first sheet,
(f) a fourth plastic body attached to the first sheet and defining a second header duct communicating with said branch ducts at the opposite end of the first sheet,
(g) said third and fourth plastic body ducts extending laterally and horizontally and having lower portions below the level of said first plastic sheet, said second sheet horizontally covering said third and fourth plastic bodies,
(h) there being insulation space below said first sheet and between said third and fourth plastic bodies,
(i) said first sheet having integral support flanges which extend longitudinally and project downwardly at opposite laterally spaced ends of said insulation space, for attachment to a roof, said second sheet extending over said flanges.

2. The combination of claim 1 wherein the third plastic body has integral flanges extending at opposite sides of the first sheet and attached thereto.

3. The combination of claim 1 wherein the fourth plastic body has integral flanges extending at opposite sides of the first sheet and attached thereto.

4. The combination of claim 1 including a thermal insulation panel confined in said space between said third and fourth plastic bodies and extending adjacent said first sheet at the side thereof opposite said second sheet.

5. The combination of claim 1 wherein said flanges are L-shaped, said flanges extending in the direction of said branch ducts, at said opposite ends of the first sheet.

6. The combination of claim 5 including a thermal insulation panel confined in said space between said L-shaped flanges and extending adjacent said first sheet at the side thereof opposite said second sheet.

7. The combination of claim 1 including spacers between said first and second sheets and interconnecting same to form dead air zones between the spacers.

8. The combination of claim 1 wherein said first sheet has a black selective coating thereon at the side thereof facing said second sheet.

9. The combination of claim 1 wherein the plastic of said first sheet is black.

10. The combination of claim 1 wherein said first and second sheets consist of plastic extrusions and are generally rectangular in outline.

11. The combination of claim 1 including plastic caps attached to the opposite ends of the ducts formed by said third and fourth plastic bodies.

12. The combination of claim 1 wherein said second sheet has peripheral flange means interlocking with said caps and extends over said third and fourth plastic bodies.

13. The combination of claim 12 wherein said sheets and bodies and caps define relatively thin, relatively light weight rectangular plastic assembly adapted to be readily carried onto the roof dwelling and installed in position thereon, with said second sheet upwardly exposed to solar radiation.

14. The combination of claim 1 including another transparent plastic sheet spaced above said second sheet to form another dead air zone therebetween.

* * * * *